(12) United States Patent
Katagiri

(10) Patent No.: US 10,850,333 B2
(45) Date of Patent: Dec. 1, 2020

(54) DRILL

(71) Applicant: TUNGALOY CORPORATION, Fukushima (JP)

(72) Inventor: Takao Katagiri, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 0 days.

(21) Appl. No.: 16/420,242

(22) Filed: May 23, 2019

(65) Prior Publication Data

US 2019/0375029 A1 Dec. 12, 2019

(30) Foreign Application Priority Data

Jun. 6, 2018 (JP) .................................. 2018-108401

(51) Int. Cl.
*B23B 51/02* (2006.01)

(52) U.S. Cl.
CPC .......... *B23B 51/02* (2013.01); *B23B 2228/10* (2013.01); *B23B 2260/072* (2013.01)

(58) Field of Classification Search
CPC .......... B23B 2228/105; B23B 2228/10; B23B 2251/122; B23B 2251/14; B23B 51/02
See application file for complete search history.

(56) References Cited

U.S. PATENT DOCUMENTS 8,628,278 B2 * 1/2014 Krenzer .................. B23B 51/02
408/230

FOREIGN PATENT DOCUMENTS

| JP | 2004-268230 A | 9/2004 |
| JP | 4608933 B | 1/2011 |
| JP | 2014087858 A * | 5/2014 |

OTHER PUBLICATIONS

English translation of JP 4608933, Jan. 12, 2011 (Year: 2011).*
English translation of JP 2014087858, May 15, 2014 (Year: 2014).*

* cited by examiner

*Primary Examiner* — Alan Snyder
(74) *Attorney, Agent, or Firm* — Studebaker & Brackett PC

(57) ABSTRACT

A drill including: a chip discharge groove formed in an outer periphery of an edge portion serving as a leading end side portion of a drill body; and a cutting edge formed in an intersecting edge between a rake surface of a leading end side region and a leading end flank of the edge portion. The drill having a margin portion, a shoulder portion and a web thinning portion. The cutting edge includes, in order from a rotation center, first cutting edge, second cutting edge, shoulder cutting edge, and margin cutting edge portions. Honing widths of the second cutting edge, the margin cutting edge, and the shoulder cutting edge portions satisfy a relation represented by expression (1), as follows: honing width of the shoulder cutting edge portion>honing width of the margin cutting edge portion≥honing width of the second cutting edge portion.

17 Claims, 7 Drawing Sheets

DRILL

TECHNICAL FIELD

The present invention relates to a drill.

BACKGROUND ART

A conventional drill for drilling is known in which cutting edges are subjected to honing and therefore become resistant to fracturing.

For example, JP2004-268230 A proposes a drill in which: a chip discharge groove which extends toward a base end is formed in an outer periphery of an edge portion serving as a leading end side portion of a drill body rotated around an axis; a cutting edge is formed in an intersecting edge between an inner wall surface of the chip discharge groove and a leading-end flank of the edge portion, wherein such inner wall surface faces forward with respect to a drill rotating direction; and, on a leading end side of the inner wall surface of the chip discharge groove, a web thinning portion is formed which leads to an inner peripheral end of the cutting edge, whereby the inner peripheral end of the cutting edge serves as a web thinning cutting edge portion, and in the above drill, honing is performed on the cutting edge; the honing width of the web thinning cutting edge portion is set so as to be constant throughout the web thinning cutting edge portion; and the honing width of an outer peripheral end of an outer peripheral cutting edge portion leading to an outer periphery of the web thinning cutting edge portion is set so as to be at least 1.5 times greater than the honing width of the web thinning cutting edge portion.

Further, for example, JP4608933 B proposes a drill in which: a chip discharge groove which extends toward a base end is formed in an outer periphery of a drill body rotated around an axis; and a cutting edge is formed in an intersecting edge between a rake surface serving as a leading end side region of an inner wall surface of the chip discharge groove and a leading end surface of the drill body, wherein such inner wall surface faces forward with respect to a drill rotating direction, and in the above drill, honing is performed on a shoulder portion which extends, from the outer peripheral end of the cutting edge, backward with respect to the drill rotating direction, such shoulder portion being an intersecting edge between an outer peripheral margin portion and the leading end surface of the drill body, wherein such outer peripheral margin portion intersects with the rake surface and faces toward an outer periphery; and the honing width in the honing performed on the shoulder portion is set so as to be equal to or smaller than the honing width in the honing performed on the cutting edge.

SUMMARY OF THE INVENTION

Technical Problem

With regard to drills for drilling, while there has been a trend toward cutting conditions becoming more severe compared with the prior art, in order to increase machining efficiency, a longer tool life than that achieved so far is being demanded. In particular, a drill for drilling a thin plate has a problem in that fracturing is prone to occur in a shoulder portion thereof. This makes it difficult to extend the life of the drill.

Due to such reason, in the drill disclosed in JP2004-268230 A, even if the honing width of the outer peripheral end of the outer peripheral cutting edge is merely set so as to be greater than the honing width of the web thinning cutting edge, this leads to increased cutting resistance, thereby resulting in a problem in that breakages are prone to occur. Such increased cutting resistance further results in another problem of a reduction in the machined-surface quality (machining accuracy). This accordingly invites a problem of a shortened tool life.

In the drill disclosed in JP4608933 B, the honing width of the shoulder portion is smaller than the width of the cutting edge, and this leads to insufficient strength of the shoulder portion, thereby resulting in a problem in that fracturing is prone to occur so that the tool life cannot be extended.

The present invention has been made in light of the above circumstances, and an object of the present invention is to provide a drill which has excellent wear resistance and fracture resistance and which accordingly allows for an extended tool life.

Solution to Problem

The present inventor has conducted studies regarding extending the tool life of a drill and has accordingly found that the wear resistance and fracture resistance thereof can be improved by setting each of the honing widths of respective portions of the drill so as to fall within a specific range, and found that, as a result, the tool life of the drill can be extended, and this has led to the completion of the present invention.

Namely, the gist of the present invention is as set forth below.

[1] A drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein:

the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion;

honing is performed on the second cutting edge portion, the margin cutting edge portion and the shoulder cutting edge portion; and honing widths of the respective portions satisfy a relation represented by expression (1) below.

the honing width of the shoulder cutting edge
portion>the honing width of the margin cutting
edge portion≥the honing width of the second
cutting edge portion    (1)

[2] The drill according to [1], wherein the honing width of the shoulder cutting edge portion is from 80 μm or more to 200 μm or less.

[3] The drill according to [1] or [2], wherein the honing width of the margin cutting edge portion is from 60 μm or more to 180 μm or less.

[4] The drill according to any of [1] to [3], wherein the honing width of the second cutting edge portion is from 30 μm or more to 150 μm or less.

[5] A coated drill having a coated layer formed on a surface thereof, in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the coated drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein:

the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion;

honing is performed on the second cutting edge portion, the margin cutting edge portion and the shoulder cutting edge portion; and honing widths of the respective portions satisfy a relation represented by expression (1) below.

the honing width of the shoulder cutting edge portion>the honing width of the margin cutting edge portion≥the honing width of the second cutting edge portion   (1)

[6] The coated drill according to [5], wherein the coating layer comprises a compound layer containing a compound of: an element of at least one kind selected from the group consisting of Ti, Zr, Hf, V, Nb, Ta, Cr, Mo, W, Al and Si; and an element of at least one kind selected from the group consisting of C, N, O and B.

[7] The coated drill according to [5] or [6], wherein the coating layer comprises a composite compound layer containing a compound having a composition represented by expression (2) below:

$(Al_{1-x}Cr_x)N$   (2)

(wherein x denotes an atomic ratio of the Cr element based on a total of the Al element and the Cr element and satisfies $0.10 \le x \le 0.50$).

[8] The coated drill according to any of [5] to [7], wherein an average thickness of the entire coating layer is from 0.5 μm or more to 8.0 μm or less.

The present invention can provide a drill which has excellent wear resistance and fracture resistance and which accordingly allows for an extended tool life.

DESCRIPTION OF EMBODIMENTS

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention.

[Drill]

A drill according to the present embodiment is a drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising: a margin portion intersecting with the rake surface and facing toward the outer periphery; a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein: the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion; honing is performed on the second cutting edge portion, the margin cutting edge portion and the shoulder cutting edge portion; and honing widths of the respective portions satisfy a relation represented by expression (1) below.

the honing width of the shoulder cutting edge portion>the honing width of the margin cutting edge portion≥the honing width of the second cutting edge portion   (1)

Figure 4:
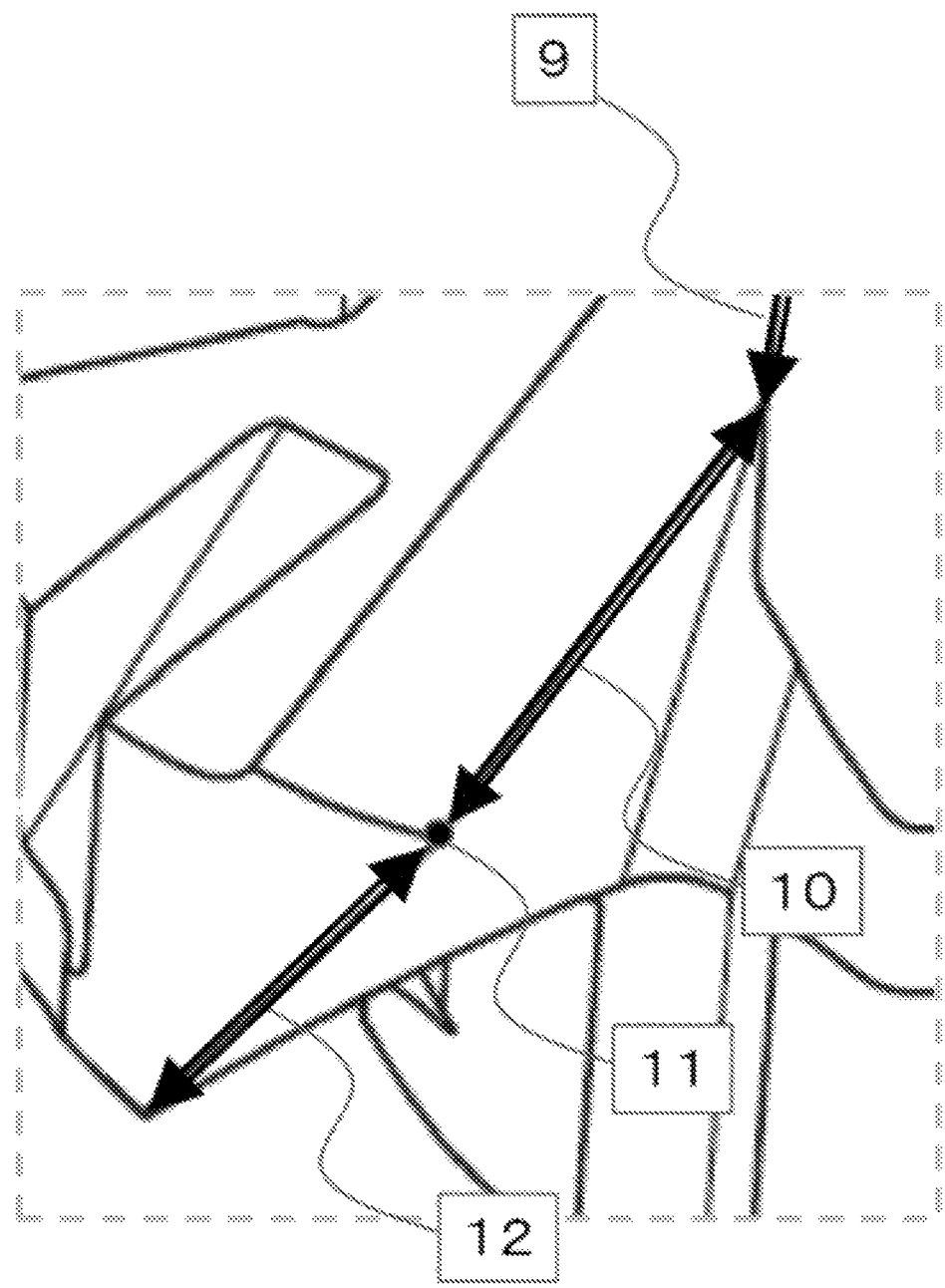
FIG. 4 is an enlarged view of the portion surrounded by the dotted line in the perspective view shown in FIG. 3.
Figure 6:
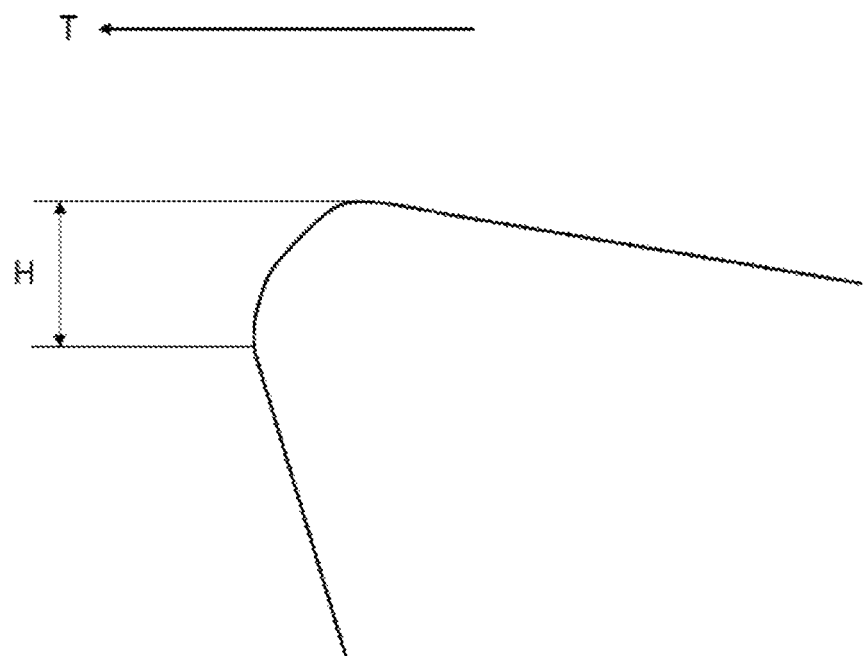
FIG. 6 shows an example of a schematic view when a cross-section of a cutting edge of a drill according to the present invention is enlarged.

In the present embodiment, the second cutting edge portion, the shoulder cutting edge portion and the margin cutting edge portion, each of which is subjected to honing, respectively refer to the respective portions indicated by reference numerals 10, 11 and 12 in the enlarged view shown in FIG. 4. Further, a honing width refers to, in the cross-section of the cutting edge portion shown in FIG. 6, a length H along a direction orthogonal to a drill rotating direction T.

In the drill of the present embodiment, the honing widths of the respective portions are each set so as to fall within a specific range, as described above, and this allows for improved wear resistance and fracture resistance, as a result which the tool life thereof can be extended. The factors for the improvements in the wear resistance and fracture resistance of the drill of the present embodiment can be considered to be set forth as follows; however, the present invention is not in any way limited by the factors set forth below. That is, firstly, in the drill, the honing width of the shoulder cutting edge portion, which is most likely to be cracked, is made the largest from among the honing widths of the respective portions, thereby leading to improved fracture resistance. Further, in the drill, the honing width of the margin cutting edge portion is made smaller than the honing width of the shoulder cutting edge portion, and this decreases the roughness of a machined surface, thereby leading to improved machined-surface quality. Meanwhile, in the drill, the honing width of the margin cutting edge portion is made equal to or greater than the honing width of the second cutting edge portion, thereby leading to improved fracture resistance. Further, in the drill, the honing width of the second cutting edge portion is made equal to or smaller than the honing width of the margin cutting edge portion, and this reduces cutting resistance, thereby leading to improved hole accuracy, and also allows the generation of chattering to be suppressed, thereby leading to the suppression of breakages of the drill.

A combination of the above configurations can be considered to achieve the following points: the drill of the present embodiment has an excellent balance between wear resistance and fracture resistance, as a result of which the tool life can be extended; and the drill of the present embodiment involves reduced cutting resistance, thereby leading to the suppression of the generation of chattering and an improvement in the cutting performance, such as an improvement in the machined-surface quality (machining accuracy).

In the drill of the present embodiment, the honing width of the shoulder cutting edge portion is preferably from 80 μm or more to 200 μm or less, and is more preferably from 150 μm or more to 190 μm or less. In the drill of the present embodiment, if the honing width of the shoulder cutting edge portion is at least the lower limit, this leads to further improved fracture resistance as the edge is strengthened, and, if the honing width thereof is no greater than the upper limit, this leads to further improved wear resistance as the cutting resistance is decreased.

In the drill of the present embodiment, the honing width of the margin cutting edge portion is preferably from 60 μm or more to 180 μm or less, and is more preferably from 100 μm or more to 140 μm or less. If the honing width of the margin cutting edge portion is at least the lower limit, this leads to further improved fracture resistance as the edge is strengthened, and, if the honing width thereof is no greater than the upper limit, this leads to further improved wear resistance as the cutting resistance is decreased.

In the drill of the present embodiment, the honing width of the second cutting edge portion is preferably from 30 μm or more to 150 μm or less, and is more preferably from 40 μm or more to 90 μm or less. If the honing width of the second cutting edge portion is at least the lower limit, this leads to further improved fracture resistance as the edge is strengthened, and, if the honing width thereof is no greater than the upper limit, this leads to further improved wear resistance as the cutting resistance is decreased.

The substrate for forming the drill of the present embodiment is not particularly limited. Examples of the substrate include a cemented carbide, cermet, ceramic, a cubic boron nitride sintered body, a diamond sintered body and high-speed steel. From among the above examples, the substrate is further preferably comprised of one or more kinds selected from the group consisting of a cemented carbide, cermet, ceramic and a cubic boron nitride sintered body because further excellent fracture resistance can be provided.

The drill of the present embodiment may have the same shape as a conventional drill except for having honing widths which satisfy the relation represented by expression (1).

In the present embodiment, honing is not particularly limited, and examples thereof include chamfer honing, R honing and combination honing.

Figure 1:
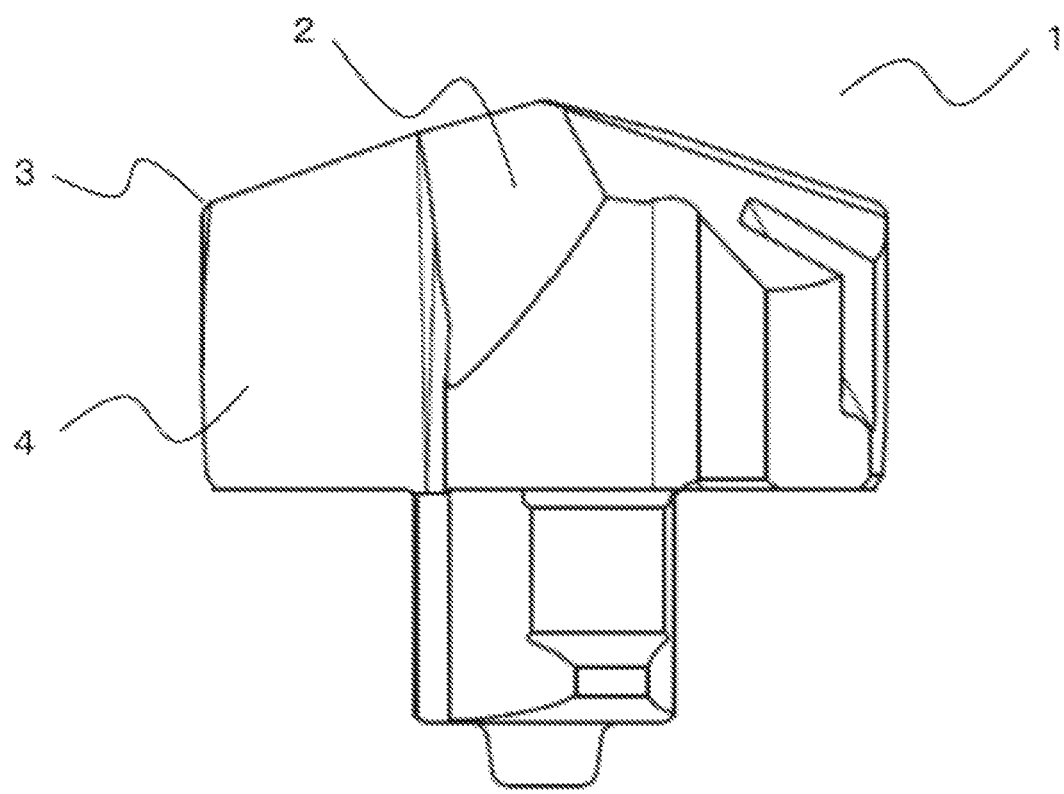
FIG. 1 shows an example of a side view of an insert body used in a drill according to the present invention.
Figure 2:
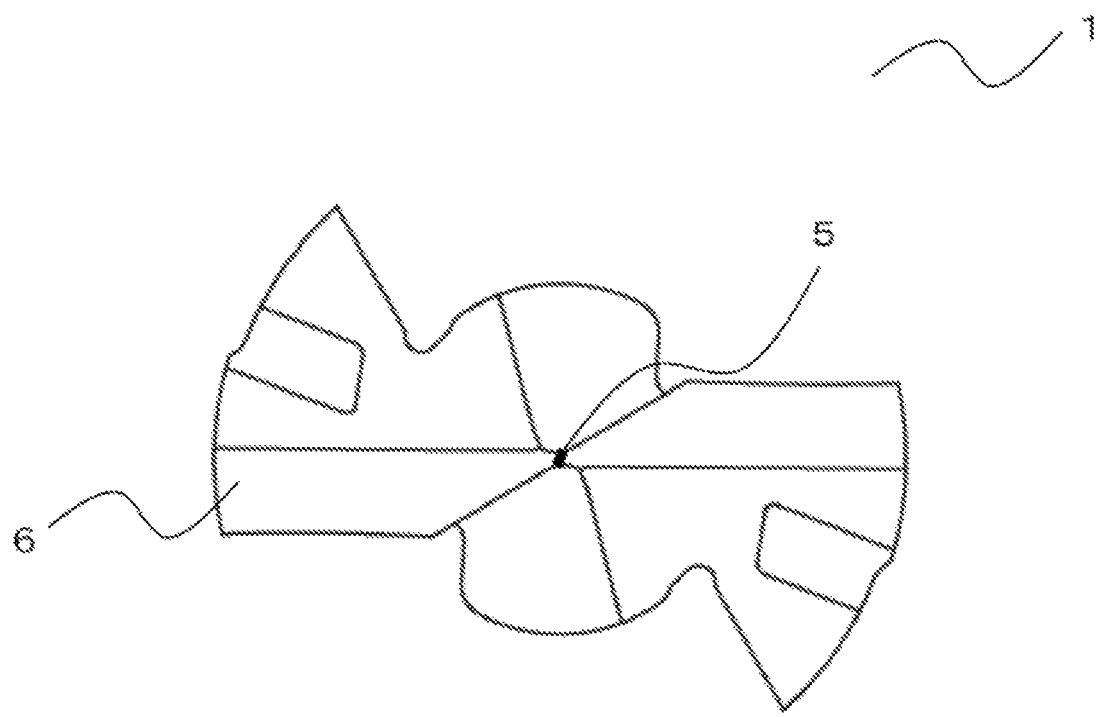
FIG. 2 shows an example of a front view of an insert body used in a drill according to the present invention.
Figure 3:
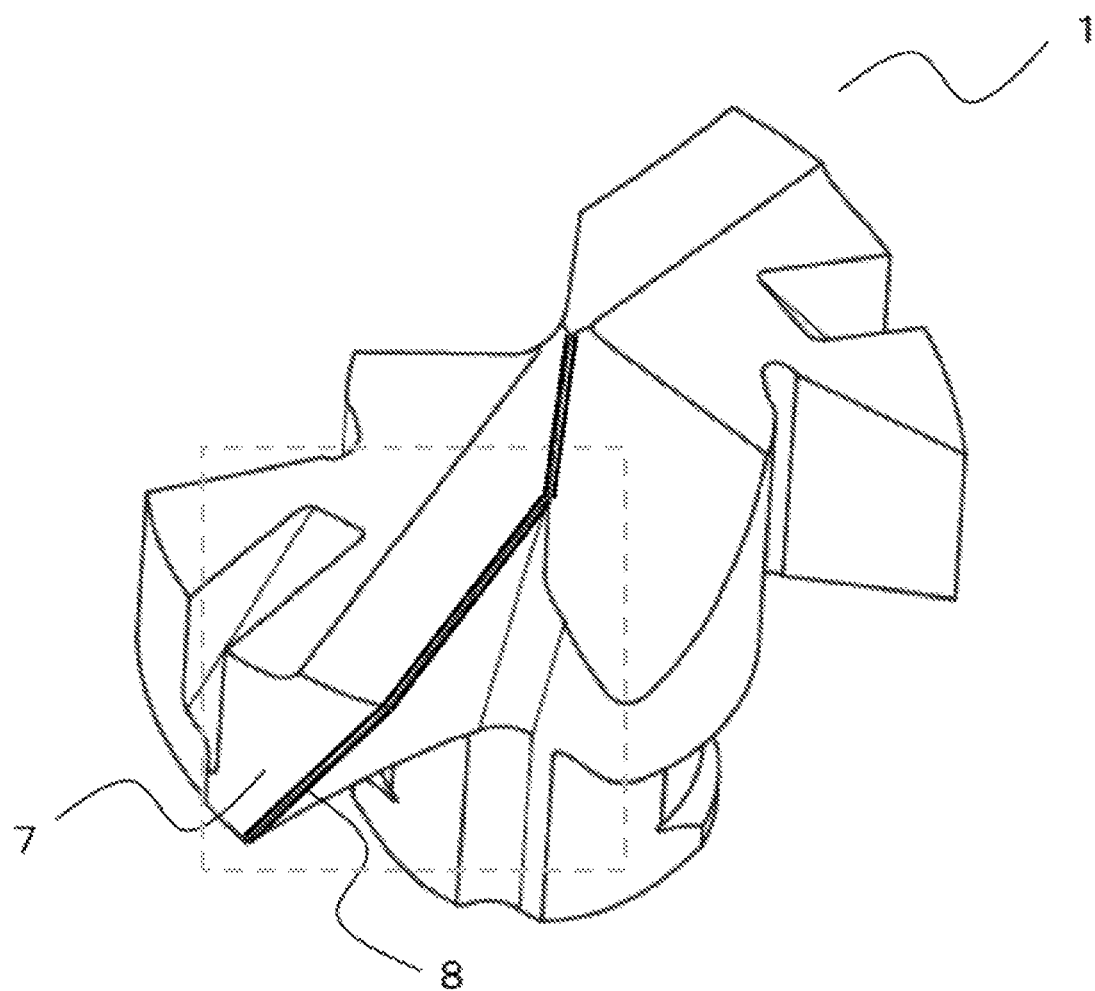
FIG. 3 shows an example of a perspective view of an insert body used in a drill according to the present invention.

FIGS. 1 to 3 each show an example of an insert body used for the drill of the present embodiment. This insert body 1 includes web thinning portions 2, shoulder portions 3, chip discharge grooves 4, a chisel 5, flanks 6, margin portions 7 and entire cutting edges 8. Such insert body is incorporated into a drill body 13, as shown in, for example, FIG. 5.

Figure 5:
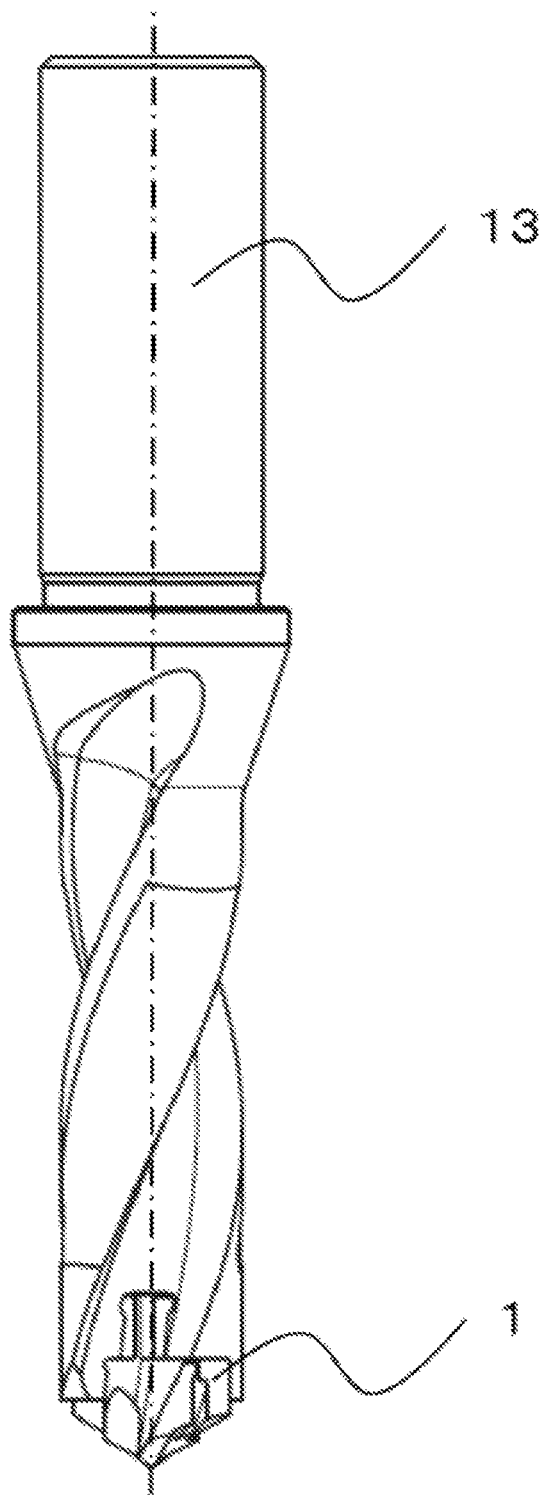
FIG. 5 shows an example of a schematic view of a drill according to the present invention.

As shown in FIG. 5, the drill body 13 is, for example, formed into a substantially cylindrical shape around an axis (the long-dashed short-dashed line in FIG. 5), and a base end side portion of the drill body 13 is regarded as a shank portion held by a rotational axis of a machine tool, whereas a leading end side portion thereof is regarded as the insert body (edge portion).

Further, as shown in FIGS. 1 to 3, in an outer periphery of the insert body 1 (edge portion), a pair of chip discharge grooves 4 are formed in a symmetrical manner with respect to an axis, and such chip discharge grooves 4 are twisted backward with respect to a drill rotating direction T at a constant helix angle, heading from the flank on the leading end side to the base end in an axial direction. The cutting edge 8 is formed in an intersecting edge between a rake surface of a leading end side region of an inner wall surface facing forward with respect to the drill rotating direction T in each of the chip discharge grooves 4 and the leading end flank of the edge portion.

As shown in FIG. 1, the web thinning portion 2 is formed so as to extend toward a leading end of the inner wall surface of the chip discharge groove 4.

In the drill of the present embodiment, a second cutting edge portion 10, a shoulder cutting edge portion 11 and a margin cutting edge portion 12, which are shown in FIG. 4, each are subjected to honing so as to satisfy the relation represented by expression (1). Since honing is performed on the drill of the present embodiment in this way, such drill has an excellent balance between wear resistance and fracture resistance, as a result of which the tool life can be extended.

As to the drill of the present embodiment having the above-described configuration, for instance, the drill body 13 is fed toward the leading end in the axial direction while being rotated around the axis, so that the drill body 13 gradually bites a workpiece, starting from an inner peripheral end of a web thinning cutting edge portion 9, whereby drilling is performed on such workpiece, and such drilling continues by discharging chips, such chips being generated by the cutting edge 8, toward the base end in the chip discharge groove 4.

[Coated Drill]

A coated drill according to the present embodiment has the same shape as the above-described drill except that a coating layer is formed on a surface of the coated drill, and the honing widths of respective portions satisfy the relation represented by expression (1) below.

the honing width of the shoulder cutting edge portion>the honing width of the margin cutting edge portion≥the honing width of the second cutting edge portion (1)

In the coated drill of the present embodiment, the honing widths of the respective portions are each set so as to fall within a specific range, as described above, and this allows such coated drill to have improved wear resistance and fracture resistance, as a result of which the tool life can be extended.

In the coated drill of the present embodiment, the coating layer preferably comprises a compound layer containing a compound of: an element of at least one kind selected from the group consisting of Ti, Zr, Hf, V, Nb, Ta, Cr, Mo, W, Al and Si; and an element of at least one kind selected from the group consisting of C, N, O and B. Further, the compound layer may be comprised of a single layer or multiple layers of two or more layers. The coated drill of the present embodiment indicates the tendency of the wear resistance to be further improved if the coating layer comprises the above-described compound layer.

In the coated drill of the present embodiment, the coating layer more preferably comprises a composite compound layer containing a compound having a composition represented by expression (2) below:

$(Al_{1-x}Cr_x)N$ (2)

(wherein x denotes an atomic ratio of the Cr element based on a total of the Al element and the Cr element and satisfies 0.10≤x≤0.50).

If the coated drill of the present embodiment comprises the above-described composite compound layer as a coating layer, this leads to an increased high-temperature hardness and a decreased friction coefficient, thereby indicating the tendency of the wear resistance to be further improved. Further, if the coated drill of the present embodiment comprises the above-described composite compound layer as a coating layer, this allows the progress of wear in the shoulder portion to be suppressed even with an increased honing width of the shoulder portion, thereby indicating the tendency of the strength of the shoulder portion to be maintained and to become resistant to fracturing, as a result of which the tool life can be extended.

In the coated drill of the present embodiment, an average thickness of the entire coating layer is preferably from 0.5 μm or more to 8.0 μm or less.

The coated drill of the present embodiment indicates the tendency of the wear resistance to be further improved if the average thickness of the entire coating layer is 0.5 μm or more. Meanwhile, if the average thickness of the entire coating layer is 8.0 μm or less, this indicates the tendency of the fracture resistance to be further improved. Therefore, the average thickness of the entire coating layer is preferably from 0.5 μm or more to 8.0 μm or less.

The coating layer used in the present embodiment preferably includes an alternating laminate structure in which layers of two or three or more kinds, each kind having a different composition, are laminated in an alternating manner. At least one layer in the alternating laminate structure preferably comprises a composite compound layer (hereinafter referred to as a "first composite nitride layer") containing a compound having the composition represented by expression (2) described above.

The compound having the composition represented by expression (2) above in the first composite nitride layer used in the present embodiment preferably contains cubic crystals or contains cubic crystals and hexagonal crystals. In expression (2) above, x denotes an atomic ratio of the Cr element based on a total of the Al element and the Cr element and satisfies 0.10≤x≤0.50. If the atomic ratio x of the Cr element is 0.10 or more, this can prevent a hexagonal Al nitride from being produced, as a result of which the coated drill of the present embodiment has a decreased friction coefficient, thereby leading to further improved wear resistance. Meanwhile, if the atomic ratio x of the Cr element is 0.50 or less, this can prevent a Cr nitride from being produced, as a result of which the coated drill of the present embodiment has an improved high-temperature hardness, thereby leading to excellent wear resistance, and can also prevent the residual stress of the first composite nitride layer from being reduced, thereby leading to excellent fracture resistance. In particular, x is preferably from 0.15 or more to 0.50 or less because the coated drill of the present embodiment has a more excellent balance between wear resistance and fracture resistance.

At least one layer in the alternating laminate structure of the coating layer used in the present embodiment preferably comprises a specific layer as described below (hereinafter referred to as a "second composite nitride layer"). The second composite nitride layer used in the present embodiment preferably contains a compound having a composition represented by expression (3) below.

$(Ti_{1-y}Si_y)N$ (3)

The compound having the composition represented by expression (3) above in the second composite nitride layer used in the present embodiment preferably contains cubic crystals. y denotes an atomic ratio of the Si element based on a total of the Ti element and the Si element, and y satisfies 0.00<y<1.00, preferably satisfies 0.01≤y≤0.50, and more preferably satisfies 0.05≤y≤0.30. If the atomic ratio y of the Si element is more than 0.00, this indicates the tendency of the hardness to be improved, and, in particular, if the atomic ratio y is 0.01 or more, and is preferably 0.05 or more, this results in a further improved hardness, thereby indicating the tendency of the coated drill of the present embodiment to have further excellent wear resistance. Meanwhile, if the atomic ratio y of the Si element is less than 1.00, this can prevent an amorphous phase from being produced, thereby indicating the tendency of the coated drill of the present embodiment to have excellent wear resistance, and can also suppress the residual compressive stress in the coating layer, thereby indicating the tendency of the coated drill of the present embodiment to have excellent adhesion. From the same perspective, the atomic ratio y is preferably 0.50 or less, and is more preferably 0.30 or less. In particular, y is preferably from 0.10 or more to 0.25 or less because the coated drill of the present embodiment preferably has a more excellent balance between wear resistance and adhesion.

In the present embodiment, when the composition of each composite nitride layer is represented by $(Al_{0.70}Cr_{0.30})N$, such representation indicates that the atomic ratio of the Al element based on a total of the Al element and the Cr element is 0.70 and that the atomic ratio of the Cr element based on a total of the Al element and the Cr element is 0.30. That is, such representation indicates that the amount of the Al element based on a total of the Al element and the Cr element is 70 atom % and that the amount of the Cr element based on a total of the Al element and the Cr element is 30 atom %.

In the coated drill of the present embodiment, when the coating layer includes the above-described alternating laminate structure, if the average thickness of each of the layers of each of the first composite nitride layer and the second composite nitride layer is 70 nm or more, this can prevent the internal stress of the coating layer from being increased, thereby indicating the tendency of the fracture resistance to be improved. Meanwhile, if the average thickness of each of the layers of each of the first composite nitride layer and the second composite nitride layer is 300 nm or less, this can provide the effect of preventing cracking from progressing toward the substrate, thereby indicating the tendency of the fracture resistance to be improved. From the same perspective, the average thickness of each of the layers of each of the first composite nitride layer and the second composite nitride layer is preferably from 100 nm or more to 300 nm or less, and is more preferably from 120 nm or more to 250 nm or less.

Figure 7:
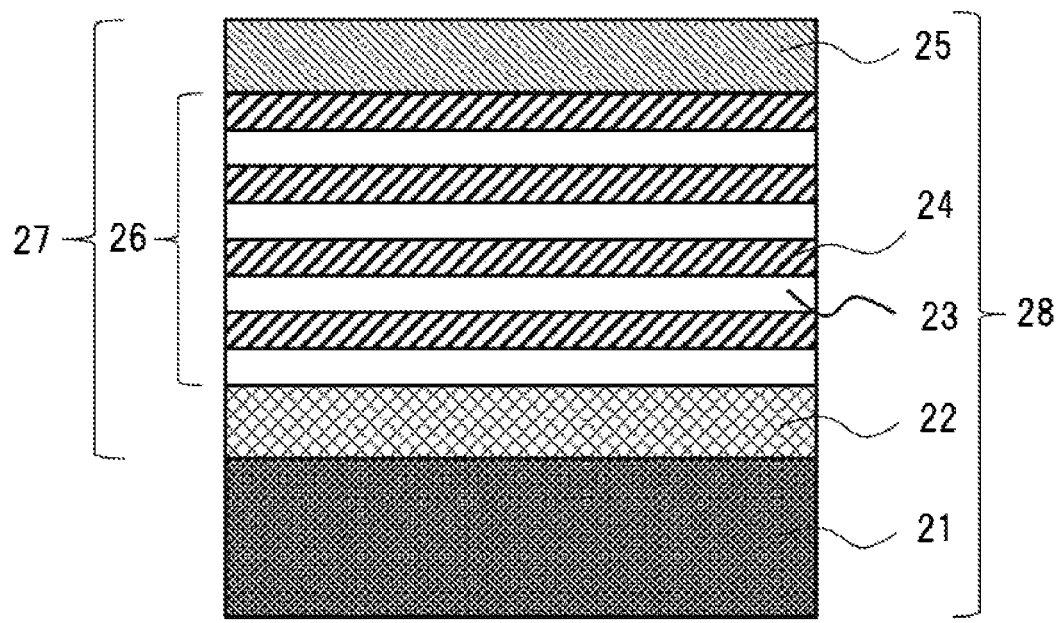
FIG. 7 shows an example of a schematic view of a cross-sectional structure of a coated drill according to the present invention.

In the present embodiment, when one first composite nitride layer and one second composite nitride layer are formed, the "number of repeats" is one, and the alternating laminate structure used in the present embodiment encompasses an alternating laminate structure in which the number of repeats is one. FIG. 7 is a schematic view showing an example of a cross-sectional structure of the coated drill of the present embodiment, and this will be used below in order to describe the number of repeats. This coated drill 28 includes a substrate 21 and a coating layer 27 formed on a surface of the substrate 21. The coating layer 27 is obtained by laminating a lower layer 22, which will be described below, an alternating laminate structure 26, and an upper layer 25, which will be described below, in order from the substrate 21 side. The alternating laminate structure 26 is obtained by laminating, in an alternating manner, a first composite nitride layer 23 and a second composite nitride layer 24, in order from the lower layer 22 side to the upper layer 25 side, and the resulting laminate includes four first composite nitride layers 23 and four second composite nitride layers 24. In such case, the number of repeats is four. Further, for example, when forming five first composite nitride layers 23 and five second composite nitride layers 24, i.e., a first composite nitride layer 23, a second composite nitride layer 24, a first composite nitride layer 23, a second composite nitride layer 24, a first composite nitride layer 23, a second composite nitride layer 24, a first composite nitride layer 23, a second composite nitride layer 24, a first composite nitride layer 23, and a second composite nitride layer 24, in order from the lower layer 22 side to the upper layer 25 side, the number of repeats is five. Although, in FIG. 7, the coating layer 27 includes both the lower layer 22 and the upper layer 25, the coating layer may instead include only either one of the lower layer 22 and the upper layer 25, or include neither of such two layers.

In the coated drill of the present embodiment, if the average thickness of the alternating laminate structure is 0.5 µm or more, this indicates the tendency of the wear resistance to be further improved, and if such average thickness is 8.00 µm or less, this indicates the tendency of the fracture resistance to be further improved.

The coating layer used in the present embodiment may be comprised of the above-described compound layer or the alternating laminate structure alone consisting of the respective composite nitride layers. However, it is preferable for a lower layer to be provided between the substrate and the alternating laminate structure (i.e., located as a layer below the alternating laminate structure) because the adhesion between the substrate and the alternating laminate structure is further improved. In particular, the lower layer, from the same perspective as that set forth above, preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B, more preferably contains a compound of: an element of at least one kind selected from the group consisting of Ti, V, Nb, Ta, Cr, Mo, W, Al, Si and Y; and an element of at least one kind selected from the group consisting of C, N, O and B, and further preferably contains a compound of: an element of at least one kind selected from the group consisting of Ti, Cr, Mo, Al, Si and Y; and N. Further, the lower layer may be comprised of a single layer or multiple layers of two or more layers.

In the present embodiment, the average thickness of the lower layer is preferably from 0.1 µm or more to 3.5 µm or less because this indicates the tendency of the adhesion between the substrate and the coating layer to be further improved. From the same perspective, the average thickness of the lower layer is more preferably from 0.2 µm or more to 3.0 µm or less, and is further preferably from 0.3 µm or more to 2.5 µm or less.

The coating layer used in the present embodiment may have an upper layer on a side of the alternating laminate structure which is opposite to the substrate (i.e., an upper layer on the alternating laminate structure), preferably on a surface of the alternating laminate structure. The upper layer further preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B because this provides further excellent wear resistance. Further, from the same perspective as that set forth above, the upper layer preferably contains a compound of: an element of at least one kind selected from the group consisting of Ti, Zr, Hf, V, Nb, Ta, Cr, Mo, W, Al, Si and Y; and an element of at least one kind selected from the group consisting of C, N, O and B, more preferably contains a compound of: an element of at least one kind selected from the group consisting of Ti, V, Nb, Ta, Cr, Mo, W, Al, Si and Y; and an element of at least one kind selected from the group consisting of C, N, O and B, and further preferably contains a compound of: an element of at least one kind selected from the group consisting of Ti, Nb, Ta, Cr, W, Al, Si and Y; and N. Further, the upper layer may be comprised of a single layer or multiple layers of two or more layers.

In the present embodiment, the average thickness of the upper layer is preferably from 0.1 µm or more to 3.5 µm or less because this indicates the tendency of the wear resistance to be excellent. From the same perspective, the average thickness of the upper layer is more preferably from 0.2 µm or more to 3.0 µm or less, and is further preferably from 0.3 µm or more to 2.5 µm or less.

A method of manufacturing a coating layer used in a coated drill according to the present embodiment is not particularly limited. However, examples of such method include physical vapor deposition methods, such as an ion plating method, an arc ion plating method, a sputtering method and an ion mixing method. In particular, the arc ion plating method is more preferable because further excellent adhesion is achieved between the coating layer and the substrate.

A method of manufacturing a coated drill according to the present embodiment will be described below, using specific examples. It should be noted that the method of manufacturing a coated drill according to the present embodiment is not particularly limited, as long as the configurations of the coated drill may be achieved.

Firstly, a substrate processed in the above-described drill shape is received in a reactor of a physical vapor deposition apparatus, and metal evaporation sources are placed in the reactor. Thereafter, the reactor is evacuated until the pressure therein indicates a vacuum of $1.0 \times 10^{-2}$ Pa or lower, and the substrate is heated, by a heater in the reactor, until the temperature is from 200° C. or higher to 700° C. or lower. After the heating, an Ar gas is introduced into the reactor so that the pressure therein is from 0.5 Pa or higher to 5.0 Pa or lower. In the Ar gas atmosphere with a pressure of from 0.5 Pa or higher to 5.0 Pa or lower, a bias voltage of from −500 V or higher to −350 V or lower is applied to the substrate, and a current of from 40 A or higher to 50 A or lower is caused to flow through a tungsten filament in the reactor, whereby an ion bombardment process is carried out, with the Ar gas, on a surface of the substrate. After the ion bombardment process is carried out on the substrate surface, the reactor is evacuated until the pressure therein indicates a vacuum of $1.0 \times 10^{-2}$ Pa or lower.

When forming the compound layer used in the present embodiment, the substrate is heated until the temperature is from 400° C. or higher to 600° C. or lower. After the heating, a gas is introduced into the reactor such that the pressure therein is from 0.5 Pa or higher to 5.0 Pa or lower. Examples of such gas include an $N_2$ gas when the compound layer comprises a compound of: an element of at least one kind selected from the group consisting of Ti, Zr, Hf, V, Nb, Ta, Cr, Mo, W, Al and Si; and N, and further examples of such gas also include a gas mixture of an $N_2$ gas and a $C_2H_2$ gas when the compound layer comprises a compound of: an element of at least one kind selected from the group consisting of Ti, Zr, Hf, V, Nb, Ta, Cr, Mo, W, Al and Si; and N and C. The volume ratio of the gas mixture is not particularly limited; however, such volume ratio may be $N_2$ gas:$C_2H_2$ gas=95:5 to 85:15, by way of example. Then, a bias voltage of from −80 V or higher to −40 V or lower is applied to the substrate, and a metal evaporation source according to the metal components of each layer is evaporated via an arc discharge with an arc current of from 100 A or higher to 200 A or lower, whereby the compound layer may be formed.

When forming the first composite nitride layer used in the present embodiment, the substrate is controlled such that the temperature is from 400° C. or higher to 600° C. or lower, a nitrogen gas ($N_2$) is introduced into the reactor, and the pressure in the reactor is set at from 0.5 Pa or higher to 5.0 Pa or lower. Thereafter, a bias voltage of from −80 V or higher to −40 V or lower is applied to the substrate, and a metal evaporation source according to the metal components of the first composite nitride layer is evaporated via an arc discharge with an arc current of from 100 A or higher to 200 A or lower, whereby the first composite nitride layer may be formed.

When forming the second composite nitride layer used in the present embodiment, the substrate is controlled such that the temperature is from 400° C. or higher to 600° C. or lower. It should be noted that the substrate temperature is preferably the same as the substrate temperature when the first composite nitride layer is formed because the first composite nitride layer and the second composite nitride layer can be formed in a continuous manner. After the temperature control, an $N_2$ gas is introduced into the reactor so that the pressure therein is from 0.5 Pa or higher to 5.0 Pa or lower. Then, a bias voltage of from −80 V or higher to −40 V or lower is applied to the substrate, and a metal evaporation source according to the metal components of the second composite nitride layer is evaporated via an arc discharge with an arc current of from 100 A or higher to 200 A or lower, whereby the second composite nitride layer may be formed.

In order to form the alternating laminate structure of the first composite nitride layer and the second composite nitride layer, two or more kinds of metal evaporation sources are evaporated in an alternating manner via an arc discharge under the conditions set forth above, whereby the respective composite nitride layers may be formed in an alternating manner. By adjusting the arc discharge time for each of the metal evaporation sources, the thickness of each composite nitride layer which constitutes the alternating laminate structure can be controlled.

When forming the lower layer and/or the upper layer used in the present embodiment, such lower layer and/or upper layer may be formed under the same manufacturing conditions as those described above for the compound layer. That is, firstly, the substrate is heated until the temperature is from 400° C. or higher to 600° C. or lower. After the heating, a gas is introduced into the reactor such that the pressure therein is from 0.5 Pa or higher to 5.0 Pa or lower. Examples of such gas include an $N_2$ gas when the lower layer and/or the upper layer comprise(s) a compound of: an element of at least one kind selected from the group consisting of Ti, Zr, Hf, V, Nb, Ta, Cr, Mo, W, Al, Si and Y; and N, and further examples of such gas also include a gas mixture of an $N_2$ gas and a $C_2H_2$ gas when the lower layer and/or the upper layer comprise(s) a compound of: an element of at least one kind selected from the group consisting of Ti, Zr, Hf, V, Nb, Ta, Cr, Mo, W, Al, Si and Y; and N and C. The volume ratio of the gas mixture is not particularly limited; however, such volume ratio may be $N_2$ gas:$C_2H_2$ gas=95:5 to 85:15, by way of example. Then, a bias voltage of from −80 V or higher to −40 V or lower is applied to the substrate, and a metal evaporation source according to the metal components of each layer is evaporated via an arc discharge with an arc current of from 100 A or higher to 200 A or lower, whereby the lower layer and/or the upper layer may be formed.

The thickness of each layer which constitutes the coating layer in the coated drill of the present embodiment can be measured from a cross-sectional structure of the coated drill, using an optical microscope, a scanning electron microscope (SEM), a transmission electron microscope (TEM), or the like. It should be noted that, as to the average thickness of each layer in the coated drill of the present embodiment, such average thickness can be obtained by: measuring the thickness of each layer, from each of the cross-sectional surfaces at three or more locations within 1 mm, along the cutting edge, from the shoulder portion toward the chisel thereof, and within 50 μm from the cutting edge toward the flank; and calculating the average value (arithmetic mean) of the resulting measurements.

The composition of each layer which constitutes the coating layer in the coated drill of the present embodiment can be measured from a cross-sectional structure of such coated drill, using an energy-dispersive X-ray spectroscope (EDS), a wavelength-dispersive X-ray spectroscope (WDS), or the like.

The coated drill of the present embodiment can be considered to provide the effect of being capable of extending the tool life compared with the prior art due to the major point of having excellent wear resistance and fracture resistance (it should be noted, however, that the factor for such extension of tool life is not limited thereto).

EXAMPLES

Although the present invention will be described in further detail below, with examples, the present invention is not limited to such examples.

Example 1

A machined exchangeable head drill of cemented carbide with the shape of a DMP120 insert (manufactured by Tungaloy Corporation) and a composition of 90.2% WC-9.0% Co-0.8% $Cr_3C_2$ (mass %) was prepared as a substrate. Further, the honing widths of the respective portions in each insert are shown in Table 1.

In a reactor of an arc ion plating apparatus, a metal evaporation source was arranged such that the coating layer had a composition of $(Ti_{0.55}Al_{0.45})N$. The prepared substrate was fixed to a fixation fitting of a rotating table in the reactor.

Thereafter, the reactor was evacuated until the pressure therein indicated a vacuum of $5.0\times10^{-3}$ Pa or lower. After the evacuation, the substrate was heated, by a heater in the reactor, until the temperature reached 450° C. After the heating, an Ar gas was introduced into the reactor such that the pressure therein was 2.7 Pa.

In the Ar gas atmosphere with a pressure of 2.7 Pa, a bias voltage of −400 V was applied to the substrate, and a current of 40 A was caused to flow through a tungsten filament in the reactor, whereby an ion bombardment process was carried out, with the Ar gas, on a surface of the substrate for 30 minutes. After the ion bombardment process, the reactor was evacuated until the pressure therein indicated a vacuum of $5.0\times10^{-3}$ Pa or lower.

As to invention samples 1 to 6 and comparative samples 1 to 5, after the evacuation, the substrate was controlled such that the temperature reached 450° C. (temperature when the deposition was started), a nitrogen gas ($N_2$) was introduced into the reactor, and an adjustment was conducted to achieve the gas condition of a pressure of 3.0 Pa in the reactor. Thereafter, as to invention samples 1 to 6 and comparative samples 1 to 5, a bias voltage of −40 V was applied to the substrate, and the metal evaporation source for the coating layer having a composition of $(Ti_{0.55}Al_{0.45})N$ was evaporated via an arc discharge with an arc current of 150 A, whereby the coating layer was formed on the substrate surface. At this time, control was carried out so as to maintain the above-described conditions for the gas and pressure in the reactor. Further, with regard to the thickness of the coating layer, the arc discharge time was adjusted for control so as to be 3.0 μm.

After the formation of the coating layer on the substrate surface, the heater was turned off, and the sample was taken out of the reactor after the temperature of the sample reached 100° C. or lower.

The average thickness of the coating layer of each of the obtained samples was obtained by: measuring the thickness of the coating layer via a TEM observation of each of the cross-sectional surfaces at three locations within 1 mm, along the cutting edge, from the shoulder portion of the coated drill toward the chisel thereof, and within 50 μm from the cutting edge toward the flank; and calculating the average value (arithmetic mean) of the resulting measurements.

The composition of the coating layer of the obtained sample was measured within 1 mm, along the cutting edge, from the shoulder portion of the coating drill toward the chisel thereof, and within 50 μm from the cutting edge toward the flank, using an EDS attached to a TEM.

Using the obtained samples, the following cutting test was conducted in order to perform evaluations.

[Cutting Test]
Workpiece: S55C (200HB)
Workpiece shape: Parallelepiped block of 150 mm×200 mm×10 mm
Machining form: Through holes
Cutting speed: 100 m/min
Feed per revolution: 0.35 mm/rev
Coolant: Water-soluble coolant (internal oil supply system)

Evaluation items: A time when a chisel edge was fractured (chipping occurred in a chisel edge), when a feed mark occurred in a margin portion or when a flank wear had a width of 0.3 mm was defined as the end of the tool life, and the machining length to reach the end of the tool life was measured. The measurement results are shown in Table 1.

TABLE 1

| Sample No. | Honing width (μm) | | | | Cutting test Machining length (m) |
|---|---|---|---|---|---|
| | Second cutting edge portion | Margin cutting edge portion | Shoulder cutting edge portion | Relation | |
| Invention sample 1 | 50 | 120 | 160 | Shoulder cutting edge portion > Margin cutting edge portion > Second cutting edge portion | 77 |
| Invention sample 2 | 90 | 140 | 185 | Shoulder cutting edge portion > Margin cutting edge portion > Second cutting edge portion | 68 |
| Invention sample 3 | 40 | 100 | 150 | Shoulder cutting edge portion > Margin cutting edge portion > Second cutting edge portion | 72 |
| Invention sample 4 | 90 | 160 | 165 | Shoulder cutting edge portion > Margin cutting edge portion > Second cutting edge portion | 56 |
| Invention sample 5 | 110 | 130 | 170 | Shoulder cutting edge portion > Margin cutting edge portion > Second cutting edge portion | 50 |
| Invention sample 6 | 110 | 110 | 170 | Shoulder cutting edge portion > Margin cutting edge portion = Second cutting edge portion | 48 |
| Comparative sample 1 | 120 | 100 | 80 | Second cutting edge portion > Margin cutting edge portion > Shoulder cutting edge portion | 21 |
| Comparative sample 2 | 80 | 75 | 40 | Second cutting edge portion > Margin cutting edge portion > Shoulder cutting edge portion | 16 |
| Comparative sample 3 | 40 | 40 | 40 | Second cutting edge portion = Margin cutting edge portion = Shoulder cutting edge portion | 12 |
| Comparative sample 4 | 90 | 140 | 120 | Margin cutting edge portion > Shoulder cutting edge portion > Second cutting edge portion | 31 |

TABLE 1-continued

| Sample No. | Honing width (μm) | | | | Cutting test Machining length (m) |
|---|---|---|---|---|---|
| | Second cutting edge portion | Margin cutting edge portion | Shoulder cutting edge portion | Relation | |
| Comparative sample 5 | 150 | 130 | 170 | Shoulder cutting edge portion > Second cutting edge portion > Margin cutting edge portion | 18 |

Example 2

A machined, head-exchangeable drill of cemented carbide with the shape of a DMP120 insert (manufactured by Tungaloy Corporation) and a composition of 90.2% WC-9.0% Co-0.8% $Cr_3C_2$ (mass %) was prepared as a substrate. The honing widths of the respective portions in the insert in invention sample 1 were also employed here.

In a reactor of an arc ion plating apparatus, a metal evaporation source was arranged so as to achieve the composition of each layer shown in each of Tables 2 and 3. The prepared substrate was fixed to a fixation fitting of a rotating table in the reactor.

Thereafter, the reactor was evacuated until the pressure therein indicated a vacuum of $5.0 \times 10^{-3}$ Pa or lower. After the evacuation, the substrate was heated, by a heater in the reactor, until the temperature reached 450° C. After the heating, an Ar gas was introduced into the reactor such that the pressure therein was 2.7 Pa.

In the Ar gas atmosphere with a pressure of 2.7 Pa, a bias voltage of −400 V was applied to the substrate, and a current of 40 A was caused to flow through a tungsten filament in the reactor, whereby an ion bombardment process was carried out, with the Ar gas, on a surface of the substrate for 30 minutes. After the ion bombardment process, the reactor was evacuated until the pressure therein indicated a vacuum of $5.0 \times 10^{-3}$ Pa or lower.

As to invention samples 7 to 17, after the evacuation, the substrate was controlled such that the temperature reached 450° C. (temperature when the deposition was started), a nitrogen gas ($N_2$) was introduced into the reactor, and an adjustment was conducted to achieve the gas condition of a pressure of 3.0 Pa in the reactor. Thereafter, a bias voltage of −40 V was applied to the substrate, and, as to invention samples 7 to 15 and 17, the metal evaporation source for the first layer having the composition shown in Table 2 and, if necessary, the metal evaporation source for the second layer was/were evaporated via an arc discharge with an arc current of 150 A, whereby the first layer and, if necessary, the second layer was/were formed on the substrate surface, and, as to invention sample 16, the metal evaporation sources for the first composite nitride layer and the second composite nitride layer respectively having the compositions shown in Table 3 were evaporated in an alternating manner via an arc discharge with an arc current of 150 A, whereby the first composite nitride layer and the second composite nitride layer were formed on the substrate surface in an alternating manner. At this time, control was carried out so as to maintain the above-described conditions for the gas and pressure in the reactor. Further, with regard to each of the thicknesses of the respective layers, the arc discharge time was adjusted for control so as to achieve the thickness shown in each of Tables 2 and 3.

After the formation of each layer with the predetermined average thickness shown in each of Tables 2 and 3 on the substrate surface, the heater was turned off, and the sample was taken out of the reactor after the temperature of the sample reached 100° C. or lower.

TABLE 2

| | Coating layer | | | | Average thickness of entire coating layer (μm) |
|---|---|---|---|---|---|
| | First layer | | Second layer | | |
| Sample No. | Composition | Thickness (μm) | Composition | Thickness (μm) | |
| Invention sample 7 | $(Al_{0.7}Cr_{0.3})N$ | 3.0 | — | | 3.0 |
| Invention sample 8 | $(Ti_{0.6}Al_{0.4})N$ | 0.3 | $(Al_{0.7}Cr_{0.3})N$ | 2.7 | 3.0 |
| Invention sample 9 | TiN | 3.0 | — | | 3.0 |
| Invention sample 10 | $(Al_{0.7}Cr_{0.3})N$ | 1.5 | — | | 1.5 |
| Invention sample 11 | $(Al_{0.7}Cr_{0.3})N$ | 7.0 | — | | 7.0 |
| Invention sample 12 | $(Ti_{0.9}Si_{0.1})N$ | 3.0 | — | | 3.0 |
| Invention sample 13 | $(Ti_{0.4}Al_{0.5}W_{0.1})N$ | 0.3 | — | | 3.0 |
| Invention sample 14 | $(Ti_{0.8}Mo_{0.2})N$ | 3.0 | — | | 3.0 |
| Invention sample 15 | $(Al_{0.5}Cr_{0.5})N$ | 3.0 | — | | 3.0 |
| Invention sample 17 | $(Al_{0.7}Cr_{0.3})N$ | 3.0 | — | | 3.0 |

* The "—" symbol indicates that a coating layer was not formed.

TABLE 3

| | Coating layer | | | | Average thickness of entire coating layer (μm) |
|---|---|---|---|---|---|
| | Alternating laminate structure | | | | |
| | First composite nitride layer | | Second composite nitride layer | | |
| Sample No. | Composition | Average thickness of each of layers (nm) | Composition | Average thickness of each of layers (nm) | Number of repeats (times) |
| Invention sample 16 | $(Al_{0.7}Cr_{0.3})N$ | 150 | $(Ti_{0.9}Si_{0.1})N$ | 150 | 10 | 3.0 |

The average thickness of each layer of each of the obtained samples was obtained by: measuring the thickness of each layer via a TEM observation of each of the cross-sectional surfaces at three locations within 1 mm, along the cutting edge, from the shoulder portion of the coated drill toward the chisel thereof, and within 50 μm from the cutting edge toward the flank; and calculating the average value (arithmetic mean) of the resulting measurements. The results are shown in Tables 2 and 3.

The composition of each layer of the obtained sample was measured within 1 mm, along the cutting edge, from the shoulder portion of the coated drill toward the chisel thereof, and within 50 μm from the cutting edge toward the flank, using an EDS attached to a TEM. The results are shown in Tables 2 and 3. It should be noted that the composition ratio of the metal elements of each layer in each of Tables 2 and 3 refers to an atomic ratio of each metal element relative to all the metal elements in the metal compound which constitutes each layer.

Using the obtained samples, the following cutting test was conducted to perform evaluations.

[Cutting Test]
Workpiece: S55C (200HB)
Workpiece shape: Parallelepiped block of 150 mm×200 mm×10 mm
Machining form: Through holes
Cutting speed: 100 m/min
Feed per revolution: 0.35 mm/rev
Coolant: Water-soluble coolant (internal oil supply system)
Evaluation items: A time when a chisel edge was fractured (chipping occurred in a chisel edge), when a feed mark occurred in a margin portion or when a flank wear had a width of 0.3 mm was defined as the end of the tool life, and the machining length to reach the end of the tool life was measured. The obtained measurement results are shown in FIG. 4.

TABLE 4

| | Honing width (μm) | | | | Cutting test Machining length (m) |
|---|---|---|---|---|---|
| Sample No. | Second cutting edge portion | Margin cutting edge portion | Shoulder cutting edge portion | Relation | |
| Invention sample 7 | 50 | 120 | 160 | Shoulder cutting edge portion > Margin cutting edge portion > Second cutting edge portion | 85 |
| Invention sample 8 | 50 | 120 | 160 | Shoulder cutting edge portion > Margin cutting edge portion > Second cutting edge portion | 88 |
| Invention sample 9 | 50 | 120 | 160 | Shoulder cutting edge portion > Margin cutting edge portion > Second cutting edge portion | 62 |
| Invention sample 10 | 50 | 120 | 160 | Shoulder cutting edge portion > Margin cutting edge portion > Second cutting edge portion | 56 |
| Invention sample 11 | 55 | 125 | 165 | Shoulder cutting edge portion > Margin cutting edge portion > Second cutting edge portion | 93 |
| Invention sample 12 | 50 | 120 | 160 | Shoulder cutting edge portion > Margin cutting edge portion > Second cutting edge portion | 74 |
| Invention sample 13 | 50 | 120 | 160 | Shoulder cutting edge portion > Margin cutting edge portion > Second cutting edge portion | 75 |
| Invention sample 14 | 50 | 120 | 160 | Shoulder cutting edge portion > Margin cutting edge portion > Second cutting edge portion | 67 |
| Invention sample 15 | 50 | 120 | 160 | Shoulder cutting edge portion > Margin cutting edge portion > Second cutting edge portion | 81 |
| Invention sample 16 | 50 | 120 | 160 | Shoulder cutting edge portion > Margin cutting edge portion > Second cutting edge portion | 90 |
| Invention sample 17 | 110 | 110 | 170 | Shoulder cutting edge portion > Margin cutting edge portion = Second cutting edge portion | 55 |

It is apparent from the above results that each invention sample has improved wear resistance and fracture resistance and accordingly has a long tool life.

INDUSTRIAL APPLICABILITY

The drill according to the present invention has excellent wear resistance and fracture resistance, whereby the tool life can be extended more than that involved in the prior art, and the drill therefore has high industrial applicability.

REFERENCE SIGNS LIST

1: Insert body, 2: Web thinning portion, 3: Shoulder portion, 4: Chip discharge groove, 5: Chisel, 6: Flank, 7:

Margin portion, 8: Entire cutting edge (portion indicated by a double-thick line), 9: First cutting edge portion, 10: Second cutting edge portion, 11: Shoulder cutting edge portion, 12: Margin cutting edge portion, 13: Drill body, H: Honing width, T: Drill rotating direction, 21: Substrate, 22: Lower layer, 23: First composite nitride layer, 24: Second composite nitride layer, 25: Upper layer, 26: Alternating laminate structure, 27: Coating layer, 28: Coated drill.

What is claimed is:

1. A drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising:

a margin portion intersecting with the rake surface and facing toward the outer periphery;
   a shoulder portion being an intersecting edge between the margin portion and the leading end flank of the edge portion and extending, from an outer peripheral end of the cutting edge, backward with respect to the drill rotating direction; and
   a web thinning portion extending toward a leading end of the inner wall surface of the chip discharge groove, wherein:
   the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion;
   honing is performed on the second cutting edge portion, the margin cutting edge portion and the shoulder cutting edge portion; and
   honing widths of the respective portions satisfy a relation represented by the expression:
   the honing width of the shoulder cutting edge portion>the honing width of the margin cutting edge portion≥the honing width of the second cutting edge portion.

2. The drill according to claim 1, wherein the honing width of the shoulder cutting edge portion is from 80 μm or more to 200 μm or less.

3. The drill according to claim 1, wherein the honing width of the margin cutting edge portion is from 60 μm or more to 180 μm or less.

4. The drill according to claim 1, wherein the honing width of the second cutting edge portion is from 30 μm or more to 150 μm or less.

5. A coated drill having a coated layer formed on a surface thereof, in which:

a chip discharge groove which extends toward a base end is formed in an outer periphery of an edge portion serving as a leading end side portion of a drill body rotated around an axis;
   and a cutting edge is formed in an intersecting edge between a rake surface of a leading end side region of an inner wall surface of the chip discharge groove and a leading end flank of the edge portion, such inner wall surface facing forward with respect to a drill rotating direction, the coated drill comprising:
   a margin portion intersecting with the rake surface and facing toward the outer periphery;
   a shoulder portion being an intersecting edge between the margin portion and the leading end flank of the edge portion and extending, from an outer peripheral end of the cutting edge, backward with respect to the drill rotating direction; and
   a web thinning portion extending toward a leading end of the inner wall surface of the chip discharge groove, wherein:
   the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion;
   honing is performed on the second cutting edge portion, the margin cutting edge portion and the shoulder cutting edge portion; and
   honing widths of the respective portions satisfy a relation represented by the expression:
   the honing width of the shoulder cutting edge portion>the honing width of the margin cutting edge portion≥the honing width of the second cutting edge portion.

6. The coated drill according to claim 5, wherein the coating layer comprises a compound layer containing a compound of: an element of at least one kind selected from the group consisting of Ti, Zr, Hf, V, Nb, Ta, Cr, Mo, W, Al and Si; and an element of at least one kind selected from the group consisting of C, N, O and B.

7. The coated drill according to claim 5, wherein the coating layer comprises a composite compound layer containing a compound having a composition represented by expression (2) below:

$$(Al_{1-x}Cr_x)N \qquad (2)$$

(wherein x denotes an atomic ratio of the Cr element based on a total of the Al element and the Cr element and satisfies 0.10≤x≤0.50).

8. The coated drill according to claim 5, wherein an average thickness of the entire coating layer is from 0.5 μm or more to 8.0 μm or less.

9. The drill according to claim 2, wherein the honing width of the margin cutting edge portion is from 60 μm or more to 180 μm or less.

10. The drill according to claim 2, wherein the honing width of the second cutting edge portion is from 30 μm or more to 150 μm or less.

11. The drill according to claim 3, wherein the honing width of the second cutting edge portion is from 30 μm or more to 150 μm or less.

12. The drill according to claim 9, wherein the honing width of the second cutting edge portion is from 30 μm or more to 150 μm or less.

13. The coated drill according to claim 6, wherein the coating layer comprises a composite compound layer containing a compound having a composition represented by expression (2) below:

$$(Al_{1-x}Cr_x)N \qquad (2)$$

(wherein x denotes an atomic ratio of the Cr element based on a total of the Al element and the Cr element and satisfies 0.10≤x≤0.50).

14. The coated drill according to claim 6, wherein an average thickness of the entire coating layer is from 0.5 μm or more to 8.0 μm or less.

15. The coated drill according to claim 7, wherein an average thickness of the entire coating layer is from 0.5 μm or more to 8.0 μm or less.

16. The coated drill according to claim 13, wherein an average thickness of the entire coating layer is from 0.5 μm or more to 8.0 μm or less.

17. A drill in which: a chip discharge groove which extends toward a base end is formed in an outer periphery of an edge portion serving as a leading end side portion of a drill body rotated around an axis; and a cutting edge is formed in an intersecting edge between a rake surface of a leading end side region of an inner wall surface of the chip discharge groove and a leading end flank of the edge portion, such inner wall surface facing forward with respect to a drill rotating direction, the drill comprising:

a margin portion intersecting with the rake surface and facing toward the outer periphery;

a shoulder portion being an intersecting edge between the margin portion and the leading end flank of the edge portion and extending, from an outer peripheral end of the cutting edge, backward with respect to the drill rotating direction; and a web thinning portion extending toward a leading end of the inner wall surface of the chip discharge groove, wherein:

the cutting edge comprises, in order from a rotation center, a first cutting edge portion formed in the web thinning portion, a second cutting edge portion formed closer to the outer periphery than the first cutting edge portion, a shoulder cutting edge portion formed in the shoulder portion, and a margin cutting edge portion formed in the margin portion;

honing is performed on the second cutting edge portion, the margin cutting edge portion and the shoulder cutting edge portion; and honing widths of the respective portions satisfy a relation represented by the expression:

the honing width of the shoulder cutting edge portion>the honing width of the margin cutting edge portion>the honing width of the second cutting edge portion.

\* \* \* \* \*